United States Patent [19]

Shiragaki et al.

[11] Patent Number: 5,757,526
[45] Date of Patent: May 26, 1998

[54] OPTICAL COMMUNICATION NETWORK AND METHOD FOR OPTICALLY DETECTING A FAULT

[75] Inventors: Tatsuya Shiragaki; Naoya Henmi, both of Tokyo, Japan

[73] Assignee: NEC Corporation, Tokyo, Japan

[21] Appl. No.: 758,381

[22] Filed: Nov. 29, 1996

[30] Foreign Application Priority Data

Dec. 11, 1995 [JP] Japan .................. 7-322035

[51] Int. Cl.[6] .................................. H04B 10/08
[52] U.S. Cl. .............................. 359/110; 359/177
[58] Field of Search ................... 359/110, 160, 359/174, 177; 370/242, 243, 245, 246, 248

[56] References Cited

U.S. PATENT DOCUMENTS

| | | | |
|---|---|---|---|
| 5,077,729 | 12/1991 | Wong | 359/110 |
| 5,257,126 | 10/1993 | Calvani et al. | 352/156 |
| 5,278,686 | 1/1994 | Grasso et al. | 359/110 |
| 5,321,541 | 6/1994 | Cohen | 359/110 |
| 5,377,035 | 12/1994 | Wan et al. | 359/151 |
| 5,383,046 | 1/1995 | Tomofuji et al. | 359/110 |
| 5,440,418 | 8/1995 | Ishimura et al. | 359/177 |
| 5,500,756 | 3/1996 | Tsushima et al. | 359/177 |
| 5,510,917 | 4/1996 | Corke et al. | 359/110 |
| 5,535,037 | 7/1996 | Yoneyama | 359/177 |
| 5,555,477 | 9/1996 | Tomooka et al. | 357/179 |

OTHER PUBLICATIONS

T. H. Wu; "Fiber Network Service Survivability"; Artech House, 1992, pp. 6–7.

T. Shiragaki et al. et al.; "A Novel Optical Cross–Connect System using Photonic Switch Matrices for Flexible Optical Network Reconfiguration"; 17th European Conference on Optical Communication (1993); pp. 153–156.

*Primary Examiner*—Rafael Bacares
*Attorney, Agent, or Firm*—Whitham, Curtis & Whitham

[57] ABSTRACT

An optical communication network for quickly detecting faults and rerouting data using the optical signals in their light form, superimposes a monitoring signal on an optical data signal. The optical data signal and the monitoring signal are superimposed by, for example, wavelength-multiplexing or polarization-multiplexing. A receiving node receives the superimposed signal and splits it back into the optical data signal and the monitoring signal. A processor in the receiving node analyzes the monitoring signal to determine whether a fault exists in the transmission path. Similarly, the processor can analyze the data signal to determine whether a fault exists in a previous node or repeater. Once a fault is detected, the signal can be quickly rerouted (detoured) around the faulty section (node).

30 Claims, 8 Drawing Sheets

OPTICAL COMMUNICATION NETWORK AND METHOD FOR OPTICALLY DETECTING A FAULT

BACKGROUND OF THE INVENTION

1. Field of the Invention

The present invention generally relates to an optical communication network and method therefor, and, more particularly to a method and an optical communication network having transmission path and node fault detection.

2. Description of the Related Art

When using an optical communication, a capacity of an optical transmission path may be increased due to broadband characteristics of light. However, to perform a photoelectric conversion of all optical signals in intermediate nodes, having no relation to the destination node of the signals, is disadvantageous since it makes the transmission apparatus larger and increases cost. Thus, an optical communication network which switches an optical signal as it is (i.e., light having had no photoelectric conversion) has attracted attention.

Figure 9:
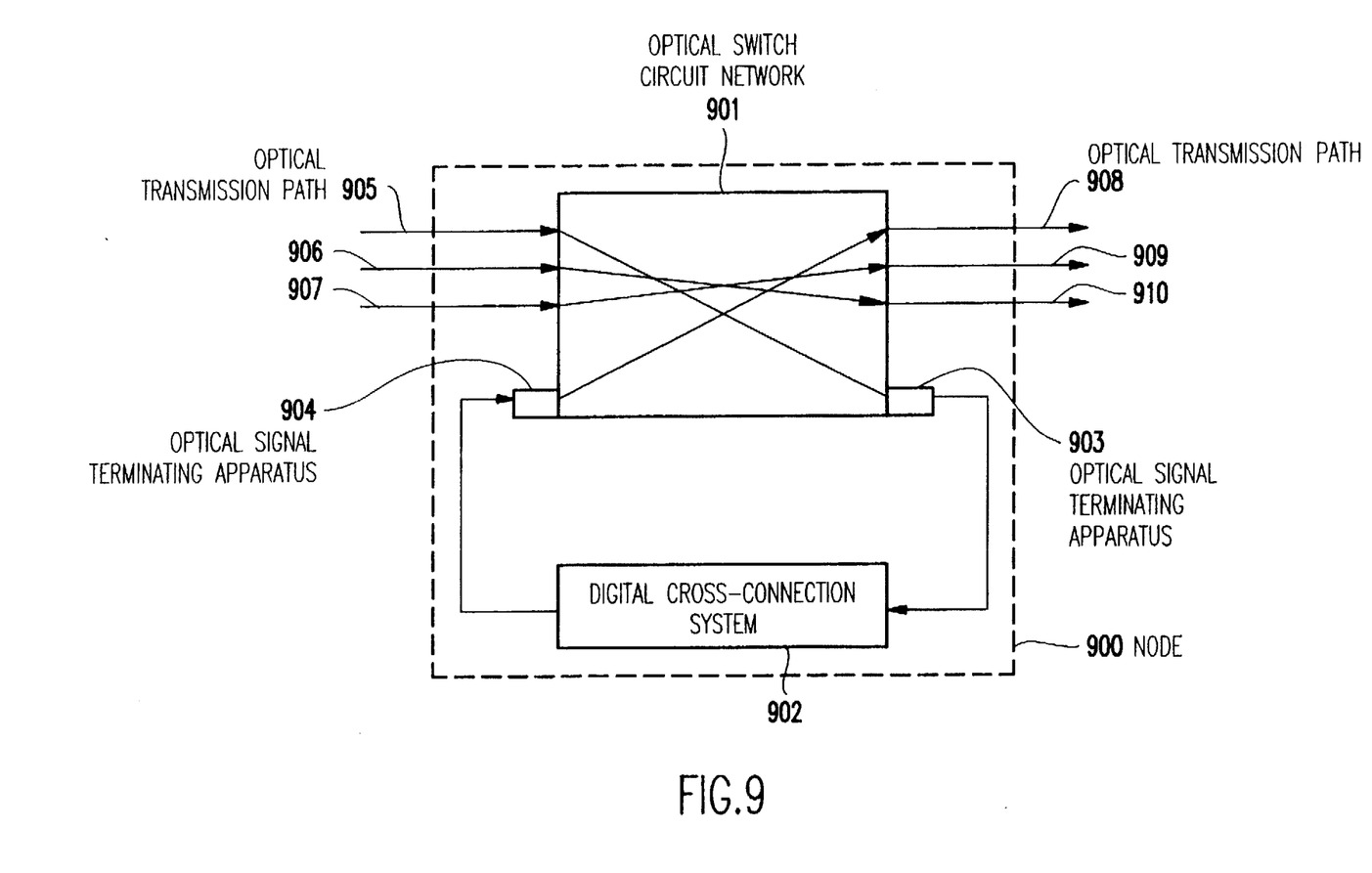
FIG. 9 is a figure explaining an example of the related art.

An optical communication network node apparatus as shown in FIG. 9 has been developed (e.g., see Shiragaki et al., *European Conference on Optical Communication Proceedings* (ECOC), Vol. 2, 1993, pp. 153. FIG. 9 shows a block diagram of the Shiragaki et al. node configuration and FIG. 10 shows an exemplary optical switch circuit network 901 used in a node.

In FIG. 9, reference number 900 represents an optical cross-connection node. Numbers 905 to 910 show optical transmission paths to be connected to other nodes. Number 902 is a digital cross-connection system of paths of SDH (Synchronous Digital Hierarchy).

Figure 10:
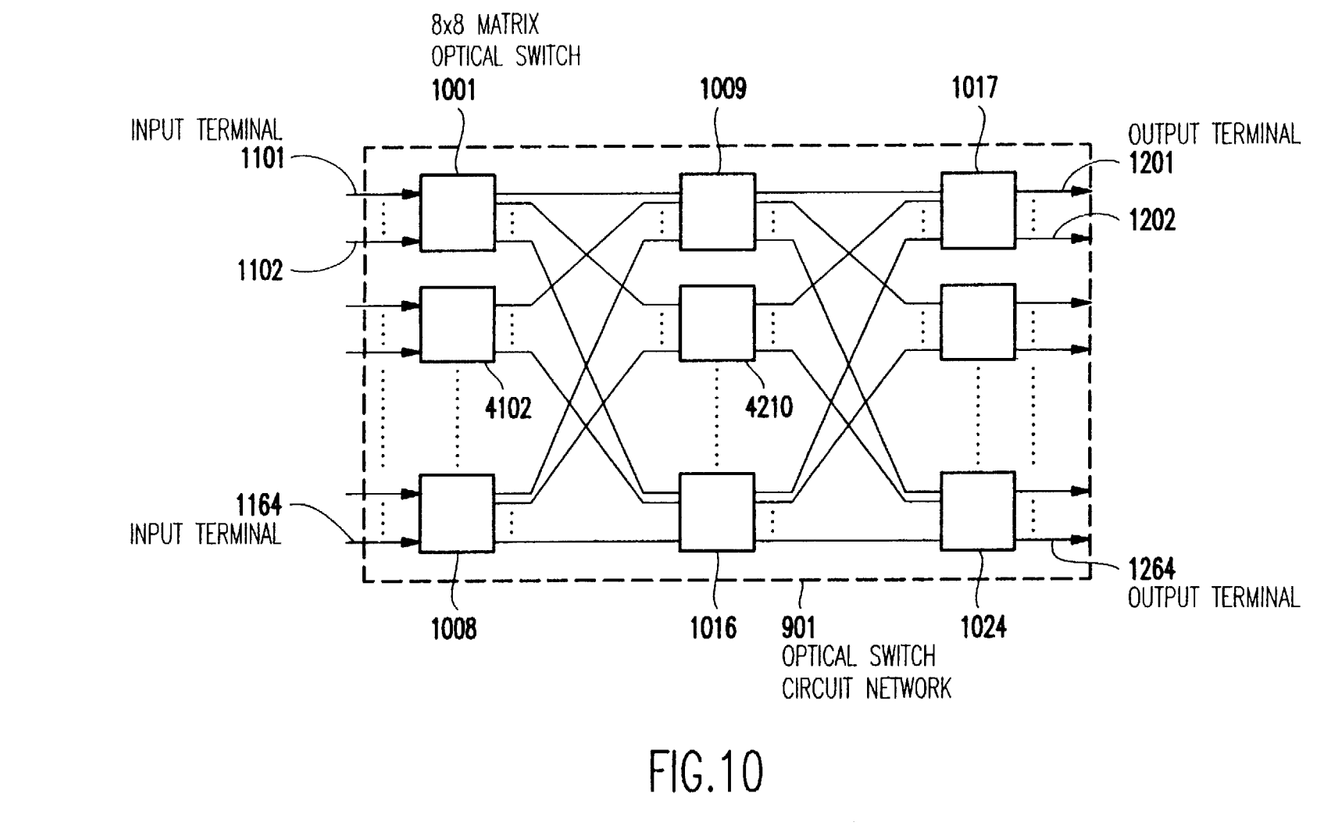
FIG. 10 is a figure for explaining an example light separating node.

In FIG. 10, numbers 1001 to 1024 are 8×8-matrix optical switches formed of LiNbO$_3$, numbers 1101 to 1164 are input terminals of the optical switch circuit network, and numbers 1201 to 1264 are output terminals of the optical switch circuit network. The optical switch circuit network can be formed by connecting the matrix optical switches 1001 to 1024 as shown in FIG. 10.

In an optical cross-connection network, a signal converted from an electrical signal to an optical signal in a node, is output to an optical transmission path. The optical signal transmitted through optical transmission paths 906 and 907 is switched (since it is an optical signal) by the optical switch circuit network 901, and is transmitted onto optical transmission paths 909 and 910. In this manner, a great capacity of optical signals may be switched and network efficiency may be greatly improved.

Further, since this system does not need a time-division multiplex processing to switch a great capacity of optical signals, each node apparatus may be made smaller.

Unfortunately, this increased capacity has made it increasingly important to quickly identify and cope with trouble in transmission paths of a network or node faults, particularly in networks using an optical cross-connection system in a trunk network.

In a network using an optical cross-connection system, as shown in FIG. 9, transmission paths 906 and 907 pass through the node 900 as light and there is no electrical conversion, and hence it is impossible to detect a fault in the optical transmission paths 906 and 907. Thus, since a fault of an optical signal must be detected at a terminal point where the optical signal is converted to an electric signal and start a fault recovery operation at the terminal point, a number of nodes participate in communication of information related to the fault recovery, thereby taking a long time for fault recovery.

Additionally, since an optical signal, an optical transmission path, an optical switch, and the like cannot be always monitored in the node 900, a fault point cannot be located immediately when a network fault occurs.

SUMMARY OF THE INVENTION

In view of the foregoing problems of the conventional systems, it is therefore an object of the present invention to provide an optical communication network wherein a fault can be detected in an optical node.

In a first aspect of the invention, an optical communication network is provided which includes a first light receiver, a second light receiver, and an optical function circuit. A first light separator includes an input terminal, a first output terminal, and a second output terminal, and outputs a light having a first wavelength to the first output terminal and outputs a light having a second to the second output terminal when inputting a composite light obtained by mixing the light having a wavelength belonging to the first group and the light having a wavelength belonging to the second group into the input terminal with which an optical transmission path is connected.

Additionally, a second light separator is provided which includes an input terminal, a first output terminal and a second output terminal, and branches and outputs a light inputted into the input terminal which an optical transmission path is connected to the first output terminal and the second output terminal. Finally, an information processor is provided for processing information related to operation, management and maintenance of a network.

Modifications of the first embodiment are also provided and discussed in further detail below as second through tenth embodiments.

In the first embodiment of the invention, the network separates and extracts an optical signal, which is superposed in advance on a main signal and is different in wavelength from the main signal and is modulated with information for operation, management and maintenance of a network (hereinafter referred to as an "OAM signal light", where OAM is Operation, Administration, and Maintenance), by a wavelength-division multiplexing and demultiplexing (WDM) coupler inserted before an optical signal is inputted to an optical function circuit means, and can detect breakage of an optical transmission path.

Further, a fault of the main signal is detected by an optical branching device. By confirming detection of these two faults, it can be confirmed that a fault has occurred in an optical transmission path or a node rather than in an optical transmitter. Therefore, a fault recovery operation can be performed in the node nearest to the fault point, and since the fault point has been located, a fault recovery method making a detour around only the faulty section can be used, so a quick fault recovery can be performed.

Additionally, since a detour is made around only a faulty section, a small number of reserved optical transmission paths to be prepared for recovering a fault is sufficient, and a fault recovery system can be economically built.

A second embodiment of the present invention separates and extracts a previously superposed OAM signal light different in wavelength from a main signal, by a WDM coupler inserted before an optical signal is inputted to an optical function circuit means, and can detect breakage of an optical transmission path.

Additionally, a fault of the main signal may be detected by an optical branching device. By confirming detection of these two faults, it can be confirmed that a fault has occurred in an optical transmission path or a node rather than an optical transmitter. Further, an optical signal can be superposed which is different in wavelength from the main signal and is modulated with a control information for recovering a fault by an optical coupler disposed after the optical function circuit means, and can transfer a control information for a fault recovery to another node. Therefore, a fault recovery operation can be performed by sending a control message from the node nearest to the fault point to another node, and since the fault point has been located, a fault recovery method making a detour around only the faulty section can be used. Thus, a quick fault recovery can be performed. Moreover, since a detour is made around only a faulty section, a small number of reserved optical transmission paths for recovering a fault is sufficient, and a fault recovery system can be economically built.

A third embodiment of the invention separates and extracts a previously superimposed OAM signal light different in wavelength from a main signal by inserting a wavelength separating means such as a WDM coupler before an optical signal is inputted to an optical function circuit means. A fault occurrence in an optical transmission path can be recognized in the node nearest to the optical transmission path where the fault has occurred by tapping a part of the main signal light and monitoring an optical level thereof. Therefore, a fault recovery operation may be started at the node nearest to the optical transmission path where the fault occurred and a quick fault recovery is performed.

A fourth embodiment of the invention superposes information related to OAM of a network in a transmitting node by an optical coupler, and separates it in a receiving node by a WDM coupler. When the transmitting system and the receiving system of the OAM signal are reliable, a breakage state of an optical transmission path can be found only by monitoring a reception level of the separated OAM signal light.

A fifth embodiment of the invention superposes an optical signal modulated with information related to OAM of a network (an OAM signal light) in a transmitting mode by an optical coupler, and separates in a receiving node by a WDM coupler. Whether a main signal is normally transmitted is monitored by monitoring a reception level or an error rate of a portion of the main signal tapped from it. Whether the OAM signal light has been normally transmitted is known by monitoring a reception level or an error rate of the OAM signal light separated in the receiving node. A optical transmission path having a fault cannot be determined by simply (only) monitoring the main signal in a node. A determination of which of the OAM signal light or the optical transmission path has had a fault, cannot be determined by monitoring only the OAM signal light. A fault in an optical transmission path can be recognized reliably by monitoring the main signal light and the OAM signal light.

A sixth embodiment of the invention limits monitoring of the OAM signal and the main signal light in the fifth embodiment of the invention to only their optical power, namely, reception level so as not to monitor their error rate. Since an optical receiver to monitor only a reception level is inexpensive, a low-cost optical communication network can be built.

In a seventh embodiment of the invention, since a node through which an optical signal passes (as it is) can also detect breakage of an optical transmission path connected to this node by an optical transmission path fault means, a fault recovery operation can be started at the node nearest to a fault point, and since the system makes a detour around only the faulty section, it can reduce the number of nodes participating in a fault recovery and can perform quickly the fault recovery. Since the system makes a detour around only the faulty section, it can reduce the number of reserved optical transmission paths to be prepared and can build a low-cost optical communication network.

In an eighth embodiment of the invention, since a node through which an optical signal passes (as it is) can also detect breakage of an optical transmission of an optical transmission fault means, a fault recovery operation can be started at the node nearest to a fault point. Since when a fault has been detected in a plurality of routes of the same node this fault is not a single optical transmission path fault but instead is a node fault or a double fault, this fault can be recovered by making a detour so as to include this node. Since the system makes a detour around only the faulty section, the number of nodes participating in a fault recovery can be reduced and the fault recovery is performed quickly. Further, since the system makes a detour around only the faulty section, the number of reserved optical transmission paths to be prepared is reduced and a low-cost optical communication network can be built.

In a ninth embodiment of the invention, since an information processing means of each node has in advance the information for making a detour in relation to a fault in an optical transmission path, searching a detour is performed quickly, and since it can do so by referring to a one-to-one (corresponding) information, a fault recovery is performed quickly without a lengthy detour.

In a tenth embodiment of the invention, since the system has doubled a path passing through the section where a transmission content of an optical signal is not changed and outputs the same optical signals to the double path and selects a normally-transmitted optical signal of them in the last node of the section, even when a fault has happened in either of the paths, the system can detect the fault in the last node of the section and recover the fault by switching the path. Further, since a control information need not be transferred to and from another node, fault recovery is rapid. Since an intermediate node has an optical switch circuit network which is connected to optical transmission paths, a route to be doubled can be changed and the network is easily operated.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is a block diagram showing a fourth embodiment of the invention and the like;

DETAILED DESCRIPTION OF PREFERRED EMBODIMENTS OF THE INVENTION

In the following description, as an example, it is assumed that a wavelength of a main optical signal for communication (hereinafter referred to as a main light signal) is 1.31 μm and a wavelength of an optical signal used in communication for operation, maintenance, monitoring and management of a network (hereinafter referred to as an "OAM light signal") is 1.55 μm.

Further, an optical transmitter can be formed using a distributed feedback (DFB) laser diode, and an optical receiver can be formed using an avalanche photodiode (APD). Additionally, in an optical communication network formed of a plurality of nodes each of which has an optical switch circuit network, when an optical signal which has been converted from an electrical signal in a node is output onto an optical transmission path and passes through several optical switch circuit networks (as it is an optical signal) and then is converted to an electrical signal in a node at the last stage, both of the section ends which are electrically terminated is called an "optical path" and a fault recovery of this optical path is considered.

Figure 1:
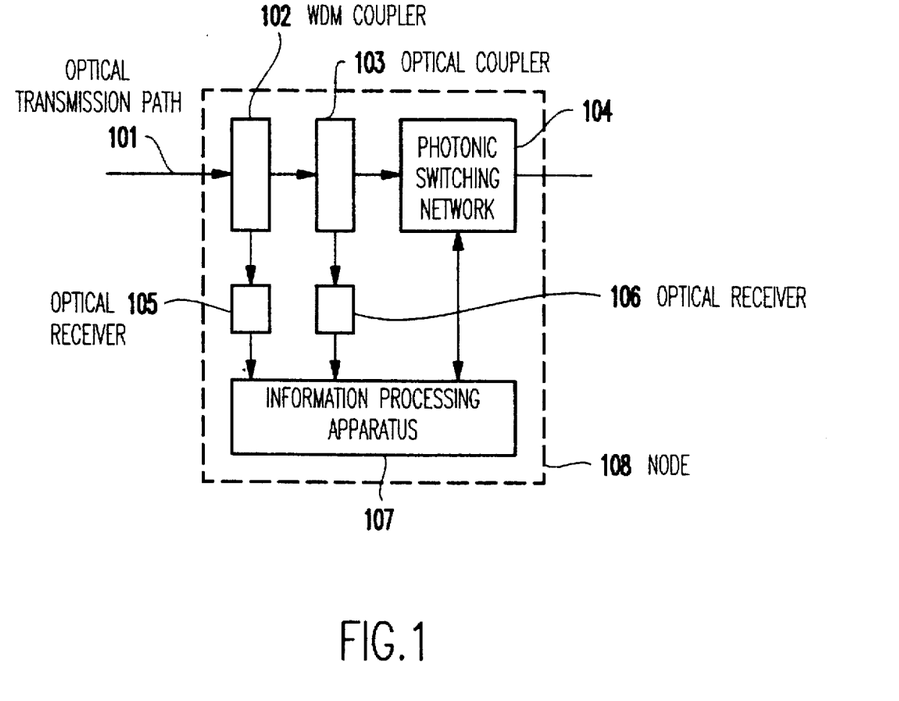
FIG. 1 is a block diagram showing a first embodiment of the invention.

Referring now to FIG. 1, a first embodiment of the invention will be described.

FIG. 1 shows an optical transmission path 101, an optical receiver 105 (a first optical receiving means), an optical receiver 106 (a second optical receiving means), an optical switch circuit network 102 (optical function circuit means), a directional coupling-type optical coupler 103 (a second optical separating means) in which a ratio of the optical power outputted to the input terminal of an optical switch circuit network 104 (e.g., a photonic switching network 104) to the optical power outputted to the input terminal of the optical receiver 106 is 95:5. A wavelength-division-multiplexing coupler 102 (a first optical sensing means) outputs light having a wavelength (e.g., 1.31 μm) to the input terminal of the optical branching device 103 and outputs a light having a second wavelength (e.g., 1.55 μm) (an OAM signal light) to the output terminal connected with the optical receiver 105. An optical communication network node 108 (optical communication network apparatus) is also provided.

An information processing apparatus 107 (information processing means) is provided for processing a signal obtained from the optical receiver 101 and can use a workstation. A 64×64 optical switch circuit network which is formed by combining a plurality of 8×8 optical switches in a matrix made of LiNbO₃, as shown in FIG. 10, is preferably used as the photonic switching network 104. Plural optical transmission paths are inputted into and outputted from the photonic switching network 104, but for convenience of explanation, only one of the input optical transmission paths and one of the output optical transmission paths are drawn in FIG. 10. The optical transmission paths can transmit an optical signal using, for example, an SDH (Synchronous Digital Hierarchy) transmission frame.

An optical signal transmitted through the optical transmission path 101 is inputted into the optical switch circuit network 104 (e.g., the photonic switching network 104).

However, when it is not connected to the WDM coupler 102, the optical branching device 103, and the optical receiver 101, since there is no detecting means for detecting breakage even when the optical transmission path 101 is broken, a fault of the optical transmission path 101 in the node 108 cannot be recognized. This is a problem similar to that faced by the conventional systems.

Additionally, the present inventor recognized that, when the WDM coupler 102 is not used and only the optical branching device is inserted, it is known from monitoring an optical power by the optical receiver 106 that a fault has happened in relation to the main signal light, but since the location of the fault cannot be determined, fault detection and a fault recovery are delayed. For example, it is necessary to find what node the main signal light reaches by making some adjoining nodes communicate with each other.

By using a system in which an optical signal of 1.55 μm (OAM signal light) has a wavelength different from that of a main signal (1.31 μm) is used for monitoring between adjoining nodes, and the OAM signal light and the main signal light are superimposed in advance on each other by the WDM coupler in the upstream (from the fault node) node and are transmitted, and the OAM signal light is separated by the WDM coupler 102 in the downstream (from the fault node) adjoining node 107, an OAM signal light fault can be recognized in the node (e.g., node 107 in this case) immediately downstream from the fault point. In the receiving node 107, when a fault occurs in an optical transmission path through which a signal is transmitted, since not only the main signal light is "damped" but also the OAM signal light is damped simultaneously, a fault is detected in the optical transmission path when its optical power is damped.

However, in this system, since a main signal light state is not directly monitored, it is impossible to confirm whether or not a fault has actually happened in the optical transmission path 101. For example, a fault may have occurred in an optical transmitter for transmitting an optical signal for monitoring.

Accordingly, as in the present invention, when the optical branching device 103 is inserted between the photonic switching network 104 and the WDM coupler 102, since the optical branching device 103 monitors an optical power of the main signal light, it may be determined whether the main signal light has a problem. By observing a reception difficulty of the OAM signal light by the optical receiver 105 and a reception difficulty of the main signal light by the optical receiver 106, a fault occurring in the optical transmission path may be determined, or at a node repeater connected to it.

Therefore, a fault recovery operation may be performed by detouring to avoid the section of the optical transmission path 101 where a fault occurred. By detouring around only the section having the fault, the number of times of communication of OAM (operation, maintenance, and management) information between the nodes may be reduced, and a fault recovery is rapid. Further, since a detour is made only around the faulty section and the sections where no fault has happened are used as they are, the number of optical transmission paths to be used are reduced and the number of reserved optical transmission paths to be prepared for fault recovery are reduced, thereby decreasing costs.

Figure 2:
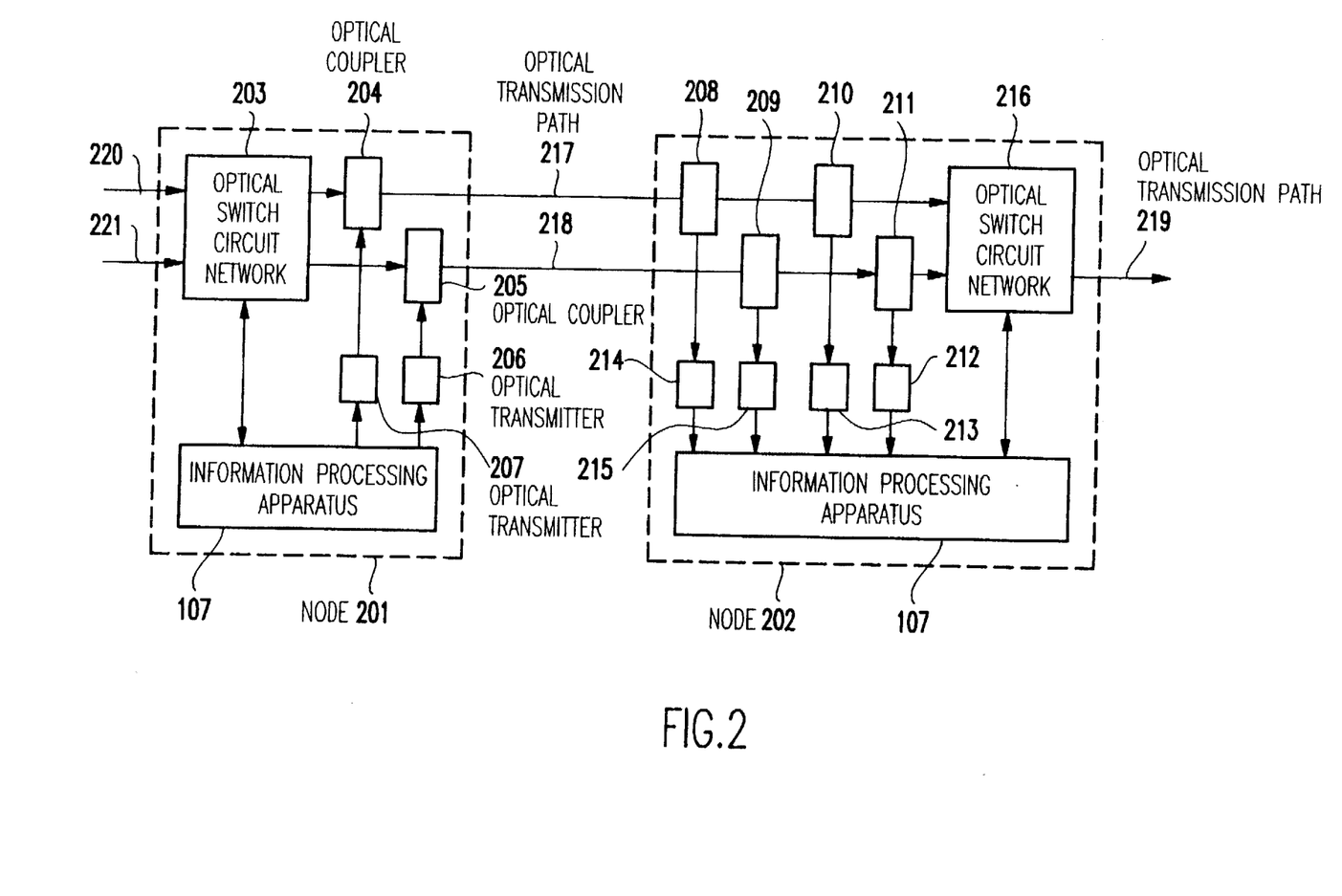
FIG. 2 is a block diagram showing the first embodiment of the invention.

FIG. 2 illustrates an exemplary fault recovery in a node 107, in which nodes 201, 202, optical switch circuit networks 203, 216 (the same as network 104 in FIG. 1) are provided. The node 107 in FIG. 1 has only one optical transmission path as an input path for convenience of explanation, but the node 202 has two optical transmission paths inputted and is substantially similar to the node 107 in FIG. 1. Optical transmitters 206, 207 are for sending out optical signals (1.55 μm) for monitoring, and optical couplers 204, 205 having a 1:1 coupling ratio are for superimposing the optical signal for monitoring on the main signal (1.31 μm).

Optical receivers 212-215 and optical transmission paths 217-221 are also provided, and optical signals having the same content are transmitted through transmission paths 220 and 221, respectively. Optical signals having the same content are transmitted also through the optical transmission paths 217 and 218, respectively. This redundant transmission is performed for detouring when a fault has occurred in either of the optical transmission paths. WDM couplers 208, 209 are for outputting a light of 1.31 μm to the optical switch network and a light of 1.55 μm to the optical receivers 214, 215. Optical couplers 210, 211 which branch a light to output 5% of it to the optical receivers 212 and 213 and 95% of it to the optical switch circuit network 216. The optical transmission path 219 can be connected to any of the optical transmission paths 217 and 218 by switching the optical switch circuit network 216 in the node 202. Although not illustrated in FIG. 2, the forward end of the optical transmission path 219 is connected to a node 203, where the main signal light is electrically terminated. It is assumed that the optical transmission path 219 is usually connected to the optical transmission path 218 and the main signal light passes through from the optical transmission path 218 to the optical transmission path 219.

Now, assuming that a fault has happened in the optical transmission path 218, the node 202 knows that a fault has happened in the optical transmission path 218 from variation in a reception level of the optical receivers 215, 212. Therefore, without waiting for a fault notification from the node 203 terminating the main signal light, the optical transmission paths my be switched to connect the optical transmission path 219 with the optical transmission path 217 where no fault has happened.

A fault recovery can be performed more quickly by omitting the communication time for a fault notification from the node 203 to the node 202. When there are more nodes transmitting an optical signal between the nodes 202 and 203, particularly when a fault recovery operation is started after a node where an electric termination is made has perceived a fault, the number of nodes to be communicated to is made larger. However, when the present invention detours around only the section having the fault, the number of nodes to be communicated may be reduced and communication time may be saved.

In the optical receivers 105 and 106, it is possible also to monitor the system by an optical power level of received signals.

In this manner, by inserting the WDM coupler 102 and the optical branching device 103 before an optical function circuit and monitoring both power levels of the main signal light and the monitoring signal light, the node immediately downstream of a fault point can reliably detect the fault in the optical transmission path connected with the upstream side of the recovery operation. Therefore, quick fault recovery can be performed, for example, by a method of starting a fault recovery operation at the present node. Further, the number of reserved optical transmission paths to be prepared, as well as the network cost can be reduced.

In this embodiment, a WDM coupler for separating an optical signal having a wavelength of 1.31 μm and an optical signal having a wavelength of 1.55 μm are used. However, the present invention can be implemented by using a WDM coupler which separates an optical signal in arbitrary wavelengths and thus is not limited to the above wavelength bands so long as it can separate the optical signal.

Second Embodiment

Hereinbelow, a second embodiment of the invention is described with reference to FIG. 3. A key difference between the first and second embodiments is that an optical coupler 305 and an optical receiver 309 for superimposing an OAM light signal on an optical signal outputted from the optical switch circuit network 104 are added to the structure of the first embodiment.

The structure of the second embodiment includes an optical communication network node 301 (optical communication network apparatus), an optical transmitter 309 (optical transmitting means) for transmitting an optical signal having a wavelength of 1.55 μm for monitoring, and an optical switch circuit network 104 (optical function circuit means).

Further provided are a workstation 107 (an information processing means for processing information related to OAM of a network), an optical coupler 305 (light superposing means) for superposing an optical signal for monitoring from an optical transmitter 309 on a main signal light from the optical switch circuit network 104 in a coupling ratio of 1:1, and an optical coupler 103 (a second light separating means) which separates an input light to output 5% of the input light to an optical receiver 106 and 95% of the input light to the optical switch circuit network 104.

Additionally provided are a WDM coupler 102 (a first light separating means) which separates an input light, and outputs a light having a wavelength of 1.31 μm to an optical coupler 103 and a light of 1.55 μm to the optical receiver 106, an optical receiver 105 (a first light receiving means) and an optical receiver 106 (a second light receiving means). As mentioned above, the second embodiment has a structure in which devices (an optical coupler 305 and an optical receiver 309) for superimposing an OAM light signal on an optical signal outputted from the optical switch circuit network 104 are added to the first embodiment.

In addition to the advantages of the first embodiment (e.g., starting a fault recovery operation at the node nearest to the fault point to quickly performing fault recovery and reduce the number of reserved optical transmission paths to be prepared) has the following advantages.

Specifically, when using a fault recovery system which starts a fault recovery operation after reporting an identifier of an optical transmission path where a fault has occurred to the terminal node, the fault location may be determined immediately, and a fault information of a network, obtained by a portion corresponding to the first embodiment to another adjoining node, is immediately transferred. The information may be transferred to the terminal node by repeating a plurality of times the transfer of the information of an optical transmission path where a fault has occurred to adjacent nodes.

Thus, the fault can be identified simply (e.g., only) at the termination node. In optical signals, a fault can be directly detected by direct confirmation of receipt of a bad (e.g., poor quality) signal at the termination node. In the terminal node, direct confirmation can be conducted, and a terminal node fault can be notified by communication with adjacent nodes. Therefore, a reliable system results by confirming the fault state.

Therefore, a fault point can be located, without determining a fault point, by polling and the like from the terminal node. Accordingly, a quick fault recovery is performed.

Since when detecting a fault recovery information related to an identifier of the optical transmission path where a fault occurs, and information of reserved optical transmission paths used for recovering the fault may be transferred to an adjoining node participating in the fault recovery, by sending a message to another node a method of starting a fault recovery operation at the fault detection node can be used rather than a method of transferring to the terminal node an identifier of the optical transmission path where the fault has occurred. Since breakage of an optical transmission path connected to a node through which an optical signal passes can be reliably detected, and a fault recovery operation can be started at the node, a quick fault recovery can be performed.

Third Embodiment

Hereinbelow, a third embodiment of the invention is described with reference to FIG. 2. Explanation of respective blocks described in the first embodiment are omitted. It is assumed that the optical transmission path and the optical transmission paths 218 and 219 are connected together.

If any of the optical couplers 204, 210 and 211, or any of the WDM couplers 208, 209 are not used, since an optical signal passes through the optical switch circuit network 302 as it is the optical signal, information related to OAM of a network, such as an instruction for changing a switch state in the optical switch circuit network 302, cannot be transferred to another node.

However, in an optical communication network of the present invention, OAM information from the information processing apparatus 107 can be made into a light having a different wavelength (e.g., 1.55 μm; a wavelength belonging to the second group) from a main signal light (e.g., 1.31 μm; a wavelength belonging to the first group) by the optical transmitters 206 and 207. Thereafter, this light and the main signal light are superposed on one another by the optical couplers 204 and 205, and thus the OAM signal can be transmitted in addition to the main signal.

In the node 202, the OAM signal light having a wavelength of 1.55 μm can be extracted by the WDM couplers 208 and 209 for separating light signals having wavelengths of 1.55 μm and 1.31 μm. Therefore, the information may be obtained as to whether the OAM signal light is normally transmitted through an optical transmission path in addition to the OAM information modulated into an OAM signal light by reception of the OAM signal light (e.g., reception using the second light receiving means). However, only with this, since it is impossible to distinguish in the node 202 a fault which has happened in an optical transmission path 218 from a fault of an optical transmitter for transmitting the OAM signal light, a switching operation for detouring is performed after detecting a fault in a node where an optical signal is terminated and then receiving a control information for recovering the fault from the node where the optical signal is terminated.

However, in the present invention, by monitoring an optical power of the main optical signal by the optical receiver 212, it can be reliably determined that a fault has happened in the optical transmission path 218. Therefore, since the node 202 can detour around the optical transmission path 218 by connecting the optical transmission paths 217 and 219 together without waiting for an instruction from the terminal node after the fault has occurred in the optical transmission path 218, a quick fault recovery is performed.

Fourth Embodiment

Hereinbelow and referring to FIG. 4, a fourth embodiment of the invention is described in which a transmitting node 401 and a receiving node 402 are provided. A light having a 1.33 μm wavelength (e.g., a wavelength belonging to the first group) is preferably used as a main signal light, and a light having a wavelength of 1.55 μm (e.g., a wavelength belonging to the second group) is used as a monitoring light.

Also provided are optical transmission paths 405–407, an optical transmitter 403 for sending out a light of 1.55 μm in wavelength, an optical receiver 404, optical switch circuit networks 408, 411 (which may be the same one as number 104 in FIG. 1), and WDM couplers 409, 410 (which may be the same as number 102 in FIG. 1).

An input terminal of the WDM coupler 409 for receiving a light of 1.31 μm is connected to the optical switch circuit network 408, and an input terminal of the WDM coupler 409 for receiving a light of 1.55 μm is connected to the optical transmitter output 403. An output terminal of the WDM coupler 410 for outputting a separated light of 1.55 μm, is connected with the optical receiver 404, and a second output terminal thereof which outputs a separated light of 1.31 μm is connected to the optical switch circuit network 411.

The main signal light output from the optical switch circuit network 408 is a light of 1.31 μm, and this light is superposed on an optical signal for monitoring outputted from the optical transmitter 403 by the WDM coupler 409, and then is inputted into the optical transmission path 406. In the receiving node, a light of 1.55 μm is inputted into the optical receiver 404 and a main signal light of 1.31 μm is inputted into the optical switch circuit network 411 by means of the WDM coupler 410.

Therefore, in the receiving node, when a fault has occurred in an optical transmission path through which a signal is transmitted, since not only the optical power of a main signal light is damped but also simultaneously an optical signal for monitoring, by simply monitoring the optical power of the signal a fault can be identified in the optical transmission path 406. Hence, a fault recovery can be performed quickly and without requiring a search of the optical transmission path in which the fault has occurred.

In the present invention the main signal light is not monitored in a node through which an optical signal passes (as light). Although, it is impossible to determine whether a fault has actually happened in relation to the main signal light, since a fault seldom occurs in a communication system of OAM information due to its high reliability, the system cost with the present invention may be reduced by monitoring only the optical power of light having a 1.55 μm wavelength by the optical receiver 404 without monitoring the main signal light, as in the present invention.

Thus, the fourth embodiment has several key advantages over, for example, the first embodiment. For example, the first embodiment must monitor both the OAM signal and the main signal, and further monitors only a breakage in the fiber optics and whether the main optical signal is damped. In contrast, in the fourth embodiment only the OAM signal needs to be monitored and measured. Further, if the transmitter 403 is reliable, then the optical coupler is not required as in the first embodiment. Thus, a smaller, more compact, and less costly apparatus results over that of the first embodiment.

Figure 4:
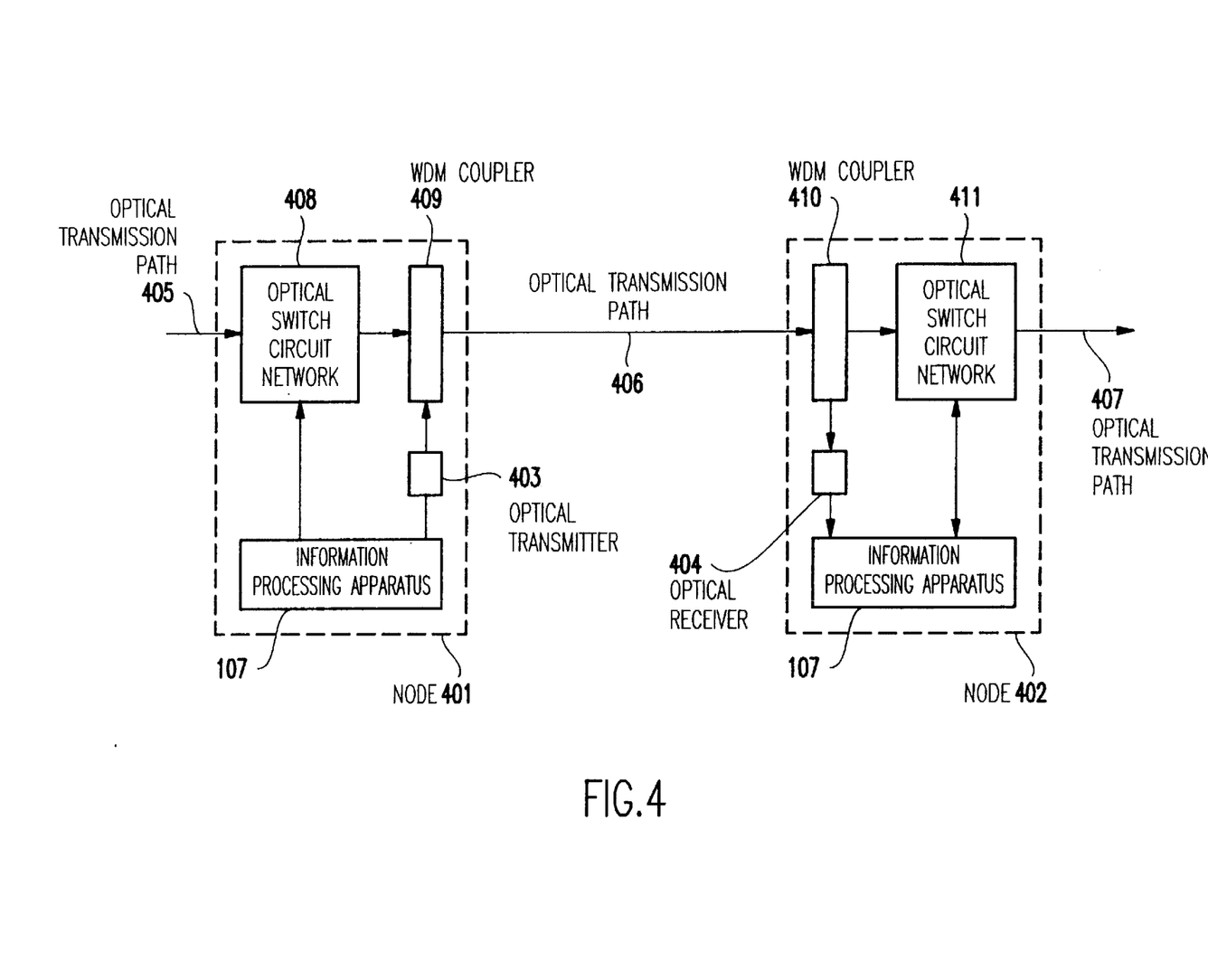
Figure 5:
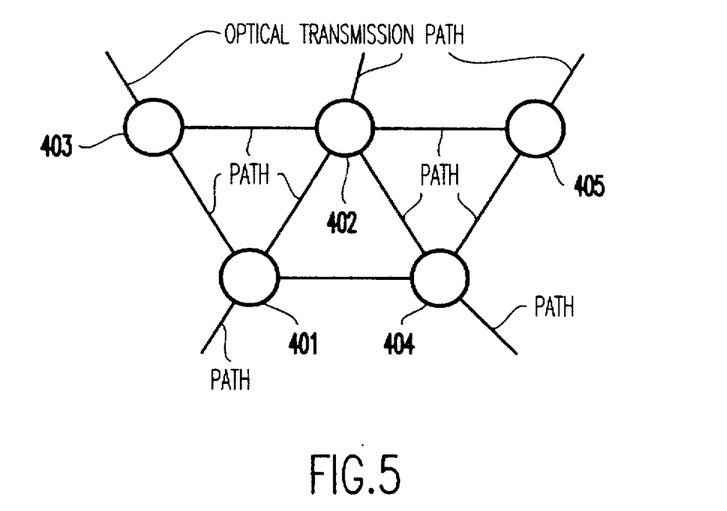
FIG. 5 is a block diagram showing the principle of the fourth embodiment of the invention.

In FIG. 4, the node 401 is set as a transmitting node and the node 402 is set as a receiving node, but they are extracted as a part of the system. In another optical signal path, the node 401 may be the receiving node and the node 402 may be the transmitting node. The nodes 401 and 402 represent simply a portion of the network. In the entire network, for example, nodes are connected together in a mesh-shape as shown in FIG. 5. For purposes of this application, a "mesh-shape" is defined as a configuration of nodes arranged in a mesh similar to a mesh topology.

However, while in the fourth embodiment, a mesh-shaped network is described, obviously the fourth embodiment can be applied to a ring-shaped network, a chain network or star-shaped network. Further, the invention may be used with trunk lines, high-capacity transmission lines or a local area network (LAN).

Fifth Embodiment

Figure 3:
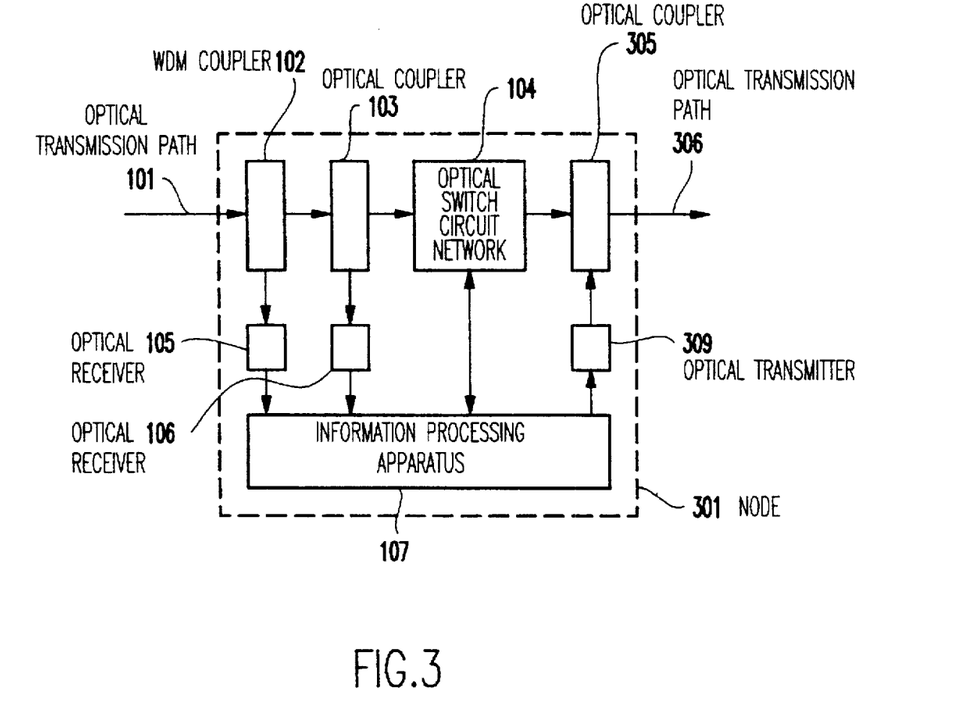
FIG. 3 is a block diagram showing a second embodiment of the invention.

A fifth embodiment of the invention is described referring to FIG. 3 (see the description of the second embodiment with regard to FIG. 3). The fifth embodiment can be implemented by connecting nodes in FIG. 3 in a mesh-shape.

An OAM signal light may be received by the WDM coupler 102 and the main signal light may be monitored by the optical coupler 103. As described in detail above in the second embodiment, since a fault in the optical transmission path 101 connected to the upstream side of the node 301 can be detected in the node 301 by monitoring these two structures, a fault recovery operation can be performed at the node nearest to the fault point, and the fault recovery can be quickly performed.

Further, since an optical transmission path where a fault has happened is immediately determined, a fault recovery is performed by detouring around only the faulty section, and the number of reserved optical transmission paths for fault recovery can be reduced. Monitoring of a bit error rate by performing a parity check and monitoring of a level of received light are performed by the optical receiver 105.

A primary advantage of the fifth embodiment over that of the second embodiment is that the optical network can be perform fault recovery by detouring around a faulty node or path.

Sixth Embodiment

Hereinbelow, a sixth embodiment of the invention is described, which limits monitoring of an optical signal in the fifth embodiment to monitoring of the optical power of an optical signal (e.g., the level of a received light). This features allows the fifth embodiment to be implemented in a low cost manner by using a reliable, but inexpensive optical receiver since only a level of a received light needs to be detected. By monitoring/making a low level fault judgement based on optical power, a rapid fault detection and fault recovery can be performed.

Seventh Embodiment

Figure 6:
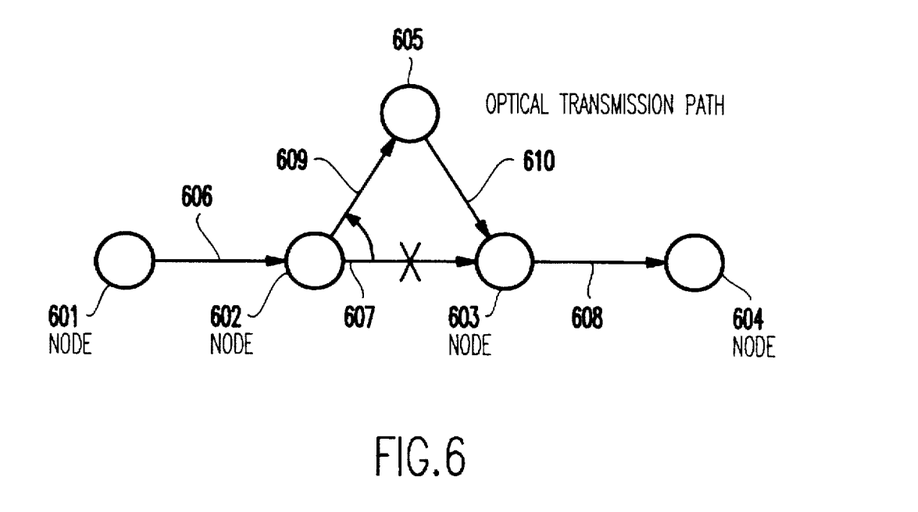
FIG. 6 is a block diagram showing the principle of a seventh embodiment of the invention.

A seventh embodiment of the invention is described using FIG. 6. In FIG. 6, nodes 601 to 605 are shown in an optical communication network. Each of the nodes has the node configuration shown in FIG. 3. An electrical signal to be transmitted is converted to an optical signal in node 601, a destination of the optical signal is changed (e.g., since it is an optical signal) in nodes 602 and 603, and the optical signal reaches node 604. The optical signal is converted to an electrical signal in the node 604 by using known circuitry. By using the configuration in FIG. 3, an optical signal having a 1.55 µm wavelength can be superposed or separated and taken out, for monitoring in each of the nodes.

Each node can detect an OAM signal light fault with the WDM coupler 102 and the optical receiver 105, and can detect a fault of the main signal light with the optical coupler 103 and the optical receiver 106. Each node can detect a fault in an optical transmission path fault through which an optical signal is transmitted by detecting breakage of these two (e.g., by an optical transmission path fault detecting means for detecting breakage of an optical signal).

For example, when the optical transmission path 607 between the nodes 602 and 603 has been broken as shown by the "X" in FIG. 6, the node 603 detects a fault in the optical transmission path 607 through which an optical signal is inputted. Thus, a fault recovery operation can be started in the node 603 as an originating point. Since no fault has occurred in the respective sections between the nodes 601 and 602 and between the nodes 603 and 604, these optical transmission paths can be used intact. Therefore, to detour via the node 605, the node 603 switches the optical transmission paths so as to connect the optical transmission path 608 to the optical transmission path 610 to form a portion of the detouring path. The information that such switching is performed when a fault has happened in the optical transmission path 607 is stored in a memory of the information processing apparatus 107 in FIG. 3.

On the other hand, by using an OAM signal light having a wavelength of 1.55 µm (the optical transmitter 309 in FIG. 3), information may be transferred regarding an optical transmission path identifier where a fault has happened and the optical transmission path 610 identifier used for a detour to the node 605 (a means for transferring information related to OAM of a network to and from another node). The information processing apparatus in the node 605 stores in advance the information that the optical transmission paths 610 and 609 are connected together if a fault occurs in the optical transmission path 607.

Therefore, when the information processing apparatus receives the information that a fault has happened in the optical transmission path 607 from the node 603, the system connects the optical transmission paths 610 and 609 together. Similarly, the information regarding that a fault has happened in the optical transmission path 607 and that the optical transmission path 609 is used as a detour are transferred also to the node 602. Since the node 602 stores the information that the optical transmission paths 609 and 606 are connected together if the information has been transferred and that the optical transmission path 609 is used as a detour if a fault occurs in the optical transmission path 607, the node 602 switches the optical switch circuit network so as to connect the optical transmission paths 606 and 609 together when receiving the information. Accordingly, the sections where no fault has occurred (e.g., the sections between the nodes 601 and 602 and between the nodes 603 and 604) can be used intact by detouring via the node 605 around only the section where a fault has happened (e.g., the section between the nodes 602 and 603).

Figure 7:
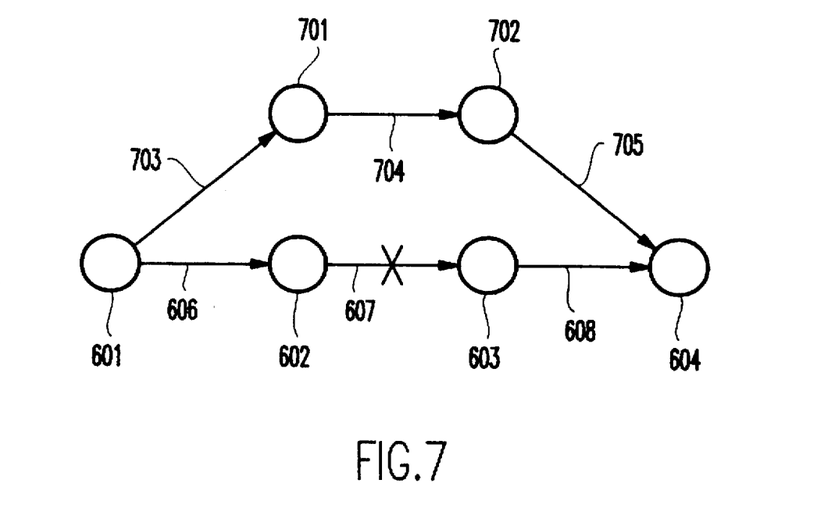
FIG. 7 is a block diagram explaining the seventh and tenth embodiments of the invention.

FIG. 7 shows a system for detouring around a section which is electrically terminated at both ends (e.g., between the ends terminating an optical path) without detouring around only the section where a fault has occurred. When a fault occurs in the optical transmission path 607, the electrically terminating node 604 detects the fault and detours by accessing the nodes 702, 701, and 601 one-by-one.

When using this system, the number of nodes participating in the fault recovery is four in FIG. 7. Since only three nodes participate in the fault recovery in FIG. 6, the method of FIG. 6 is shorter in total time during which information for a fault recovery is transferred and the fault recovery operation is performed.

FIGS. 6 and 7 show when an optical signal passes through four nodes of the nodes 601 to 604 as the current paths. However, if the number of nodes to pass through is increased, then the difference in the number of nodes to participate in the fault recovery between FIGS. 6 and 7 also becomes greater.

Specifically, in the fault recovery system in FIG. 6, only a necessary number of nodes for detouring around the faulty section participate in the fault recovery (while a detour around one node may be sufficient in FIG. 6, normally detouring around two or three nodes (at most) will recover a fault). However, in the recovery system of FIG. 7, all nodes included between the ends terminating an optical signal participate in the fault recovery.

Further, as for the number of reserved optical transmission paths to be prepared, while two of the optical transmission paths 609 and 610 are sufficient in FIG. 6, three of the optical transmission paths 703 to 705 are needed in FIG. 7, and so less reserved optical transmission paths for fault recovery are required in FIG. 6 as compared to FIG. 7. When the number of nodes which exist between the electrically-terminating nodes is great, similarly to the number of nodes participating in fault recovery, the number of reserved optical transmission paths to be prepared does not depend upon the number of nodes existing between the electrically terminated nodes in the system in FIG. 6.

However, in the system of FIG. 7, the number of reserved optical transmission paths to be prepared depends upon the number of nodes existing between the electrically terminated nodes. Thus, the more the number of nodes which exit between the electrically-terminating nodes, the larger the number of reserved optical transmission paths which must be prepared. Accordingly, the larger the number of nodes participating in fault recovery, the greater an effect of the seventh embodiment of high-speed fault recovery performance and saving of the number of reserved optical transmission paths becomes.

Hence, by using a system of detouring around only the faulty section as shown in FIG. 6, the number of nodes participating in the fault recovery can be reduced and a quick fault recovery can be performed. Further, since the number of reserved optical transmission paths to be prepared can be reduced, a fault recovery system may be economically built.

Eighth Embodiment

Figure 8:
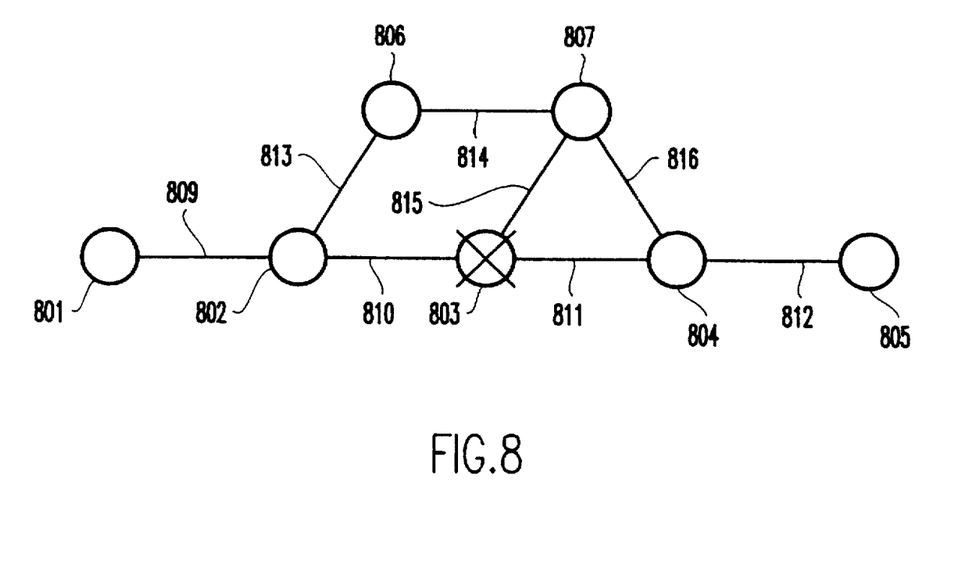
FIG. 8 is a block diagram showing the eighth embodiment of the invention.

An eighth embodiment of the invention is described referring to FIG. 8, in which nodes 801 to 808 form an optical communication network, and each of the nodes has the configuration shown in FIG. 3. Optical transmission paths 809 to 816 connect the nodes together.

Hereinbelow, a node fault occurring in node 803 as shown in FIG. 8, is described.

When a fault occurs in the node 803, the node 804 detects a fault in both a main signal light and a monitoring signal light. However, it is impossible to determine whether a fault has happened in the optical transmission path 811 or in the node 803 from only this detection. However, since the optical transmission path 811 cannot be used when node 803 is inoperable, it can be judged that a fault has happened substantially in the optical transmission path 811.

Therefore, the information that a fault occurred in the optical transmission path 811 is transferred from the node 804 to node 807, and an optical switch circuit network of the node 804 is switched, to connect the optical transmission paths 812 and 816 together. On the other hand, when a fault occurs in node 803, the node 807 detects that a monitoring optical signal, having a wavelength of 1.55 μm and which passes through the optical transmission path 815, has a reduced optical level. Therefore, the node 807 recognizes a fault in the optical transmission paths of plural routes of the node 803 (the optical transmission paths 815 and 811; "optical transmission paths of a plurality of routes connected with a node").

In this case, either a fault in the node 803 or a double fault in the optical transmission paths 811 and 815 has happened. In any case, a detour must be made to avoid the node 803. Since the information processing means of the node 807 stores in advance that, in case of detecting such a state, a switching operation is performed so as to connect the optical transmission paths 816 and 814 together and that the information of this operation is transferred to the node 806, these operations are performed in the node 807. Further, since it is stored in advance also in the information processing means of the node 806 that, in case of detecting a fault in both of the optical transmission paths 811 and 815, a switching operation is performed to connect the optical transmission paths 814 and 813 together and the information of this operation is transferred to the node 802, these operations are performed in the node 806.

Additionally, since the information processing means of the node 802 stores such information for connecting the optical transmission paths 809 and 813 together, the node 802 switches the optical switch circuit network so as to connect the optical transmission paths 809 and 813 together. By the above-mentioned operations, the optical signal transmission paths may be used where no fault has happened (the optical transmission paths 809 and 812) as they are, and perform a fault recovery operation by detouring around the node in which it has been confirmed that a fault has occurred in optical transmission paths of plural routes thereof (e.g., node 803).

Here, since the section having no fault is used as it is and a detour is made around only the faulty section similarly to the fault recovery systems in FIGS. 6 and 7 (in the seventh embodiment), less nodes participating in the fault recovery are required. Thus, since less communication among the nodes is sufficient, a rapid fault recovery can be performed and less reserved optical transmission paths to be prepared are required.

Ninth Embodiment

A ninth embodiment of the invention is used with the seventh embodiment of the invention described above. Namely, a switching operation of an optical switch circuit network in a node, and the information to transfer to other nodes when the node has obtained information related to a fault recovery, are determined in advance. By such a determination in advance, since an information processing means in each node does not have to execute a complicated algorithm such as a detour searching algorithm and the like, a fault recovery may be performed without taking a long time to make a detour. Therefore, a quick fault recovery can be performed.

Tenth Embodiment

A tenth embodiment of the invention is described referring to FIG. 7, which shows an optical communication network including optical communication network nodes 602, 603, 701, and 702, each of which has the configuration shown in FIG. 9.

An optical communication network node 601 has two optical signal terminating devices 904 which transmit optical signals having the same content. An electric branching device may be used for supplying optical signals having the same content to the two optical signal terminating devices. An optical communication network node 604 has the same configuration as node 202 in FIG. 2, and is connected with the optical transmission path 608 in FIG. 7 instead of the optical transmission path 217 in the node 202 in FIG. 2, and also is connected with the optical transmission path 705 in FIG. 7 instead of the optical transmission path 218. In node 604, the forward end of the optical transmission path 407 in FIG. 4 is connected to an optical receiver for terminating a main signal light.

In node 602, the optical transmission paths 606 and 607 are connected together in advance by an optical switch circuit network. In the node 603, the optical transmission paths 607 and 608 are connected in advance with each other by means of an optical switch circuit network. Thus, the sections among nodes 601, 602, 603, and 604 form a section through which an optical signal is transmitted as it is, and its transmitted content is not changed (a first route).

In node 701, the optical transmission paths 703 and 704 are connected together in advance by n optical switch circuit network. In the node 702, the optical transmission paths 704 and 705 are connected together in advance by an optical switch circuit network. By this, the sections among the nodes 601, 701, 702, and 604 form a section through which an optical signal is transmitted as it is, and its transmitted content is not changed (a second route).

The node 601 (the first node in the section) sends out one (a first optical signal) of the optical signals having the same content to the optical transmission path 606 (e.g., a first route) and sends out the other (a second optical signal) to the optical transmission path 703 (e.g., a second route). In the node 604, any of the optical signal passing through the optical transmission path 608 and the optical signal passing through the optical transmission path 705 can be inputted into an optical receiver of the node 604 for terminating a main signal.

Therefore, when a bit error rate of the optical receiver becomes too great (e.g., $10^{-3}$) to keep a normal receiving state, a fault recovery may be performed by switching the optical transmission paths so as to receive the other optical signal.

Now, for example, it is assumed that the node 604 receives an optical signal passing through the first route using the optical transmission path 607 (e.g., the first optical signal). When a fault has occurred in the optical transmission path 607, the values received by the node 604 are all zero (e.g., assuming that the transmitted signals are digital), and it is known that a fault has occurred in the optical signal transmission. Then, the fault is recovered by switching the optical switch circuit network in the node 604 so as to receive the optical signal from the optical transmission path 705 (e.g., the second optical signal).

With this embodiment, since a fault can be recovered simply by detecting a fault in reception of a main signal light in the node 604 terminating the optical signal and switching an optical switch circuit network in the node 604, control information need not be transferred to and from other nodes, and a fault recovery can be quickly performed.

Further, since an intermediate node has an optical switch circuit network which is connected to optical transmission paths, a route may be flexibly and easily changed by switching the optical switch circuit network to another route prepared in advance.

The tenth embodiment is not limited to the above-described structure and features. For example, while the configuration of the node 202 in FIG. 2 is used as a node configuration of the node 604, an optical signal to be received may be switched by detecting breakage of a first optical signal and breakage of a second optical signal as monitoring a main signal light by the optical coupler 103, by using the configuration of FIG. 1 for the node 604.

Additionally, in using a first optical signal and a second optical signal may be employed having different wavelengths, the invention can be implemented if a routing operation is performed in an intermediate node so that the first optical signal and the second optical reach the node 604, respectively, through different routes.

As mentioned above, while the first to tenth embodiments of the invention have been described in detail above, the invention is not limited solely to these embodiments.

For example, in some of the above embodiments, an optical branching device and a WDM coupler are used as a light separating means. However, a polarization controller and a polarized-light splitter as a light separating means also may be employed. In such a case, a main signal and an optical signal for transmitting an OAM information are transmitted by polarization-multiplex transmission such as by using transverse electric (TE) mode polarization for the main signal and transverse magnetic (TM) mode polarization for the OAM signal, and the respective blocks are connected by polarized-wave holding fibers, and the OAM information is obtained by extracting only a TM-polarized light. A device which controls polarization by applying pressure to a fiber can be used as a polarization controller, and a polarized-light splitter can be implemented by using a double refraction crystal such as $LiNbO_3$ for example.

Further, a WDM coupler for separating optical signals of 1.31 μm and 1.55 μm in wavelength has been described for the light separating means (WDM coupler). However, a WDM coupler which can separate a wavelength of a main signal light and a wavelength of an OAM signal light also can be used in the invention.

Additionally, a wavelength of 1.31 μm has been used for a main signal light and a wavelength of 1.55 μm has been used for an OAM signal light, but other wavelength bands can be used to implement the invention so long as there is an optical coupler which can separate these wavelengths. Moreover, one wavelength has been used for a main signal, but even if the main signal is multiplexed by wavelength-division, the invention still can be implemented.

Further, a space-division optical switch circuit network is used as the optical switching circuit network, but the invention can be implemented also by using a wavelength division optical switch circuit which changes an optical transmission path for each wavelength. In such a case, for example, a wavelength of 1.31 μm can be used as an OAM signal light, and a wavelength-division multiplex system dividing the 1.55 μm band at intervals of 1 μm, for example, can be used as using the 1.55 μm band as a main signal light.

Additionally, the optical coupler used as a light separating means and a light superposing means, has a branching ratio of 95:5 or 1:1, but a branching ratio other than 95:5 or 1:1 can be applied to the invention so long as the branching ratio does not affect the main signal system and has a value which can be branched so as to be received by an optical receiving means.

In the embodiments, an optical switch circuit network is used as an optical function circuit means, but passive optical devices can be used such as an optical branching device, a star coupler, a WDM coupler, an isolator, and the like. Also, the invention can add an optical component such as an optical branching device, a WDM coupler, and the like as an optical function circuit means to an optical switch circuit network. Further, the optical function circuit may include an optical receiver or an optical transmitter for a main signal as an optical function circuit means, and an optical amplifier can be used such as an Er-doped fiber and a semiconductor optical amplifier as an optical function circuit means.

Additionally, an optical function circuit means may be employed having an optical signal terminating apparatus and a switch circuit network means (a switching system or a cross-connection apparatus) for switching a signal, or an optical function circuit means having an optical signal terminating means and a repeater for regenerating and repeating an electric signal. Conversely, the optical function circuit means may include an optical circuit network for only connecting an input terminal and an output terminal together by an optical fiber, or an optical function circuit means having a light superposing circuit, a light separating circuit, or other optical function circuit connected before and after another optical function circuit. The invention also can be implemented by using a configuration including a wavelength-division multiplex switch circuit network or a time-division multiplex switch circuit network as an optical function circuit means.

An optical switch preferably made of LiNbO$_3$ is used as an optical switch in the optical switch circuit network, but an optical switch circuit network also may be used such as a mechanical-optical switch, a semiconductor-optical switch, a quartz-optical switch, and the like.

An optical switch circuit network 102 as explained in the first embodiment is preferably used as an optical switch circuit network, but an optical switch circuit network having any switch circuit configuration and any number of input and output ports also may be used.

A fault recovery of the section where an optical signal is electrically terminated has been described, but obviously the invention can be applied to any section where the content of a signal being transmitted is not changed although the optical signal is electrically terminated or repeated in the middle of transmission.

In the invention, an optical switch network which switches an optical signal as it is in each node is used, but the invention may also employ structure in which an optical signal is converted to an electrical signal and converting the electrical signal back to an optical signal and then switching the optical signal after inputting it into an optical switch circuit network.

A workstation is used as an information procession means, but any means may be used for processing an OAM information of an optical communication network such as a personal computer, a digital signal processor (DSP), an LSI, and the like.

In the embodiments, only a topology limited by a limited number of nodes has been described, it is obvious that the invention can be applied to a network having a different topology having a different number of nodes from the embodiments.

When applying the invention, it is possible to detect breakage of a connected optical transmission path in a node through which an optical signal passes as it is (light), by monitoring an optical level of a part of a main signal light obtained by tapping the main signal light or monitoring an OAM signal different in wavelength from the main signal light which is inserted and separated between adjoining nodes.

Thus, since a fault recovery operation may be started at the node nearest to the fault point, a quick fault recovery is performed by detouring around only the faulty section. Further, by detouring around only the faulty section, the number of reserved optical transmission paths to be prepared in the system may be reduced and a low-cost network results.

Additionally, by storing in advance a detour setting pattern for a fault in an optical transmission path in an information processing apparatus of each node, since a detour may be made without performing a detour searching operation, fault recovery is performed quickly.

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. An optical communication network for detecting a fault therein, comprising:

a receiver for receiving a superimposed signal through an optical path, said receiver comprising:
an optical splitter, connected to said optical path, for splitting said superimposed signal into an optical data signal and a monitoring signal; and
a processor for analyzing both said monitoring signal and said optical data signal delivered from said optical splitter, to determine whether a fault exists in said optical path coupled to said optical communication network.

2. An optical communication network as recited in claim 1, further comprising:
a transmitter for superimposing said monitoring signal on said optical data signal to create said superimposed signal and transmitting said superimposed signal through said optical path to said receiver.

3. An optical communication network as recited in claim 1, further comprising:
a first optical detector for detecting said monitoring signal output from said optical splitter.

4. An optical communication network as recited in claim 2, wherein said processor determines whether said fault exists in said optical path between said transmitter and said receiver.

5. An optical communication network as recited in claim 3, wherein said receiver further comprises:
an optical coupler for receiving said optical data signal output from said optical splitter; and
a second optical detector, connected to said optical coupler, for detecting said optical data signal for said processor to determine whether a fault exists in a portion of said optical communication network prior to said receiver.

6. An optical communication network as recited in claim 1, wherein said optical data signal and said monitoring signal have different wavelengths.

7. An optical communication network as recited in claim 1, wherein said optical splitter comprises a demultiplexer.

8. An optical communication network as recited in claim 1, wherein said optical data signal and said monitoring signal are polarized in different directions.

9. An optical communication network as recited in claim 8, wherein said superimposed signal is polarized-multiplexed, with said optical data signal having a transverse electric (TE) mode polarization and said monitoring signal having a transverse magnetic (TM) mode polarization.

10. An optical communication network as recited in claim 4, wherein when said processor determines a fault in a portion of said optical communication network prior to said receiver, said processor re-routes said superimposed signal a round said portion containing said fault.

11. An optical communication network as recited in claim 10, wherein at least two of said optical paths are positioned directly between said transmitter and receiver.

12. An optical communication network as recited in claim 2, wherein said optical communication network comprises a plurality of nodes, wherein each node in said optical communication network comprises said transmitter and said receiver.

13. A method for detecting a fault in an optical communication network, said network comprising a plurality of nodes, said method comprising steps of:
receiving a superimposed signal delivered from said optical communication network comprising an optical data signal superimposed with an optical monitoring signal at a node;

splitting said superimposed signal back into said optical data signal and into said optical monitoring signal; and analyzing both said optical monitoring signal and said optical data signal obtained by splitting, to determine whether a fault exists in an input of said optical communication network.

14. A method according to claim 13, further comprising:

superimposing an optical data signal with an optical monitoring signal to create said superimposed signal at a node; and transmitting said superimposed signal over an optical transmission path.

15. A method according to claim 13, wherein said analyzing step includes analyzing both said optical monitoring signal and said optical data signal to determine whether a fault exists in a portion of said optical communication network prior to said node.

16. A method according to claim 13, further comprising a step of:

re-routing said superimposed signal to said node if said node detects a fault.

17. A method according to claim 14, wherein said step of superimposing comprises multiplexing said optical data signal having a different wavelength than that of said optical monitoring signal.

18. A method according to claim 17, wherein said step of splitting comprises demultiplexing said superimposed signal.

19. A method according to claim 14, wherein said step of superimposing comprises polarization-multiplexing said optical data signal and said optical monitoring signal.

20. A method according to claim 19, wherein said step of splitting comprises demultiplexing said superimposed signal.

21. A method according to claim 18, further comprising steps of:

transverse electric (TE) mode polarizing said optical data signal; and transverse magnetic (TM) mode polarizing optical monitoring signal.

22. A method according to claim 16, further comprising a step of modulating control information on said optical monitoring signal for rerouting said superimposed signal if a fault is detected.

23. An optical communication network apparatus, comprising:

a splitter, connected to an optical transmission path, for splitting a superimposed signal, comprising an optical data signal superimposed with a first optical monitoring signal received through said optical transmission path, into said optical data signal and said first optical monitoring signal; and an analyzer for analyzing both said first optical monitoring signal and said optical data signal delivered from said splitter, to detect a state of said optical communication network.

24. An optical communication network apparatus as claimed in claim 23, further comprising:

means for changing said optical transmission path according to said state of said optical communication network.

25. An optical communication network apparatus as claimed in claim 23, further comprising:

means for changing a connection of said optical transmission path according to said state of said optical communication network.

26. An optical communication network apparatus as claimed in claim 23, further comprising:

means for changing a route of said optical transmission path according to said state of said optical communication network.

27. An optical communication network apparatus as claimed in claim 23, further comprising:

means for superimposing a second optical monitoring signal with said optical data signal split from said superimposed signal.

28. An optical communication network system comprising:

first and second optical communication devices each including an optical switching device and an optical transmission path disposed between said first and second optical communication devices, wherein said first optical communication device comprises a superimposing circuit for superimposing an optical monitoring signal with an optical data signal to transmit a superimposed signal to said second optical communication device through said optical transmission path, and wherein said second optical communication device comprises a splitter, connected to said optical transmission path, for splitting said superimposed signal into said optical data signal and said optical monitoring signal and an analyzer for analyzing both said optical monitoring signal and said optical data signal delivered from said splitter, to detect a state of said optical communication network.

29. An optical communication network system as claimed in claim 28, further comprising:

an optical transmission path changer for changing said optical transmission path according to said state of said optical communication network.

30. An optical communication network system as claimed in claim 28, further comprising:

a connection changing unit for changing a connection of said optical transmission path according to said state of said optical communication network.

\* \* \* \* \*